United States Patent [19]
Murai

[11] Patent Number: 5,600,647
[45] Date of Patent: Feb. 4, 1997

[54] COMMUNICATION DATA SWITCHING APPARATUS AND COMMUNICATION SYSTEM WITH SUCH SWITCHING APPARATUS

[75] Inventor: Masao Murai, Tokyo, Japan

[73] Assignee: NEC Corporation, Tokyo, Japan

[21] Appl. No.: 405,956

[22] Filed: Mar. 17, 1995

[30] Foreign Application Priority Data

Apr. 18, 1994 [JP] Japan .................................. 6-078563

[51] Int. Cl.⁶ .............................................. H04L 12/407
[52] U.S. Cl. .............................................. 370/363
[58] Field of Search ................................. 370/58.1, 58.2, 370/58.3, 60.61, 60.1, 66, 67, 68, 85.1, 94.1; 340/825.5, 825.51

[56] References Cited

U.S. PATENT DOCUMENTS

| | | | |
|---|---|---|---|
| 4,689,788 | 8/1987 | Wurzburg et al. | 370/67 |
| 4,736,409 | 4/1988 | Hasegawa et al. | 370/67 |
| 4,901,308 | 2/1990 | Deschaine | 370/67 |
| 4,998,245 | 3/1991 | Tanaka et al. | 370/85.1 |
| 5,062,106 | 10/1991 | Yamazaki et al. | 370/67 |
| 5,177,737 | 1/1993 | Daudelin et al. | 370/67 |
| 5,343,469 | 8/1994 | Ohshima | 370/95.1 |

FOREIGN PATENT DOCUMENTS 63-219248  9/1988  Japan .

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

A communication data switching apparatus for use between an input line, an output line, and a memory bus includes a receiver connected to the input line, a transmitter connected to the output line, a buffer memory for storing data received by the receiver and data to be transmitted by the transmitter, a memory transfer controller for controlling transfer of data between the buffer memory and the memory bus, and a main control unit for controlling the receiver, the transmitter, the buffer memory, and the memory transfer controller to store a signal which has been received from the input line by the receiver, in the buffer memory, to transfer the signal to the memory bus, to confirm whether data on the memory bus are addressed to a station to which the main control unit belongs, based on the content of the data, and to deliver the data through said transmitter to the output line if the data are addressed to the station. The communication data switching apparatus can quickly distribute a received signal to a plurality of stations. A communication data switching system may include a plurality of such communication data switching apparatus.

4 Claims, 8 Drawing Sheets

COMMUNICATION DATA SWITCHING APPARATUS AND COMMUNICATION SYSTEM WITH SUCH SWITCHING APPARATUS

BACKGROUND OF THE INVENTION

1. Field of the Invention

The present invention relates to a data switching apparatus, and more particularly to a communication data switching apparatus for handling packet signal data.

2. Description of the Related Art

One conventional communication data switching apparatus is shown in FIG. 1 of the accompanying drawings. As shown in FIG. 1, the conventional communication data switching apparatus comprises a plurality of receiving circuits 801 for receiving data from input lines, a central processing unit (CPU) 802 for analyzing the header of received data to determine a transmitting circuit to which the data are to be forwarded, and a plurality of transmitting circuits 803 for adding a header and so on to the data transmitted from the receiving circuits 801 and transmitting the data to output lines. The receiving circuits 801, the CPU 802, and the transmitting circuits 803 are interconnected by a data bus 804.

Operation of the conventional communication data switching apparatus shown in FIG. 1 will be described below. A signal received by one of the receiving circuits 801 includes a header in its initial part which represents a destination. The receiving circuit 801 separates the header and transmits the header to the CPU 802. The CPU 802 determines an output line to which data are to be transmitted based on the header given from the receiving circuit 801. The received signal also includes the data following the header. The data are transmitted through the CPU 802 to one of the transmitting circuits 803 which is connected to the output line which has already been determined by the CPU 802. The transmitting circuit 803 adds a new header to the data received from the CPU 802, and transmits the data with the added new header to the output line.

For speeding up the transmission of data from a receiving circuit to a transmitting circuit, Japanese laid-open patent publication No. 63-219248 discloses a process of concurrently receiving data and transmitting a packet simultaneously with the processing of a header.

An output line, i.e., a transmitting circuit, is determined based on the header of a signal received by a receiving circuit, and then data of the signal are transmitted from the receiving signal through a bus to the transmitting circuit. Therefore, if a signal received from an input line is to be transmitted to a plurality of output lines, then it is necessary to transmit the data from the receiving circuit to the transmitting circuit as many times as the number of the output lines.

Though the process disclosed in Japanese laid-open patent publication No. 63-219248 speeds up the transmission of data by concurrently receiving data and transmitting a packet simultaneously with the processing of a header, the disclosed process is required to receive and transmit data with respect to each of the stations which transmit and receive data.

If the disclosed process is employed in a MCA (Multi-Channel Access) system for relaying audio data from one station to a number of stations in digital business radio services, then delays in the relaying of data from an input line to output lines are built up, and the traffic of the bus is impeded.

SUMMARY OF THE INVENTION

It is therefore an object of the present invention to provide a communication data switching apparatus capable of quickly distributing a received signal to a plurality of stations, and a communication data switching system with such communication data switching apparatus.

According to the present invention, there is provided a communication data switching apparatus for use between an input line, an output line, and a memory bus, comprising an adapted receiver to be connected to the input line, an adapted transmitter to be connected to the output line, a buffer memory for storing data received by the receiver and data to be transmitted by the transmitter, a memory transfer controller for controlling transfer of data between the buffer memory and the memory bus, and main control means for controlling the receiver, the transmitter, the buffer memory, and the memory transfer controller to store a signal which has been received from the input line by the receiver, in the buffer memory, to transfer the signal to the memory bus, to confirm whether data on the memory bus are addressed to a station to which the main control means belongs, based on the content of the data, and to deliver the data through the transmitter to the output line if the data are addressed to the station.

The buffer memory may comprise a memory bus address counter for determining an address for the memory bus, a memory data bus, a line receiving circuit for outputting received data from the receiver to the memory data bus, a memory bus receiving circuit for outputting data from the memory bus to the memory data bus, a memory bus transmitting circuit for delivering data from the memory data bus to the memory bus, an interface circuit for exchanging data between the memory data bus and the main control means, a RAM having a data terminal connected to the memory data bus, and an adder for adding a predetermined number of bits to an output signal from the memory bus address counter, and the main control means may comprise means for writing the signal received by the receiver in the RAM at an address represented by an output signal from the adder.

A communication data switching system comprises a plurality of communication data switching apparatus constructed as described above.

Data received by the main control means are stored in the buffer memory and transferred to the memory bus. Since the data are simultaneously transmitted to a number of stations, the time required to deliver the data can be shortened.

If the address, at which the received signal is written in the RAM, is represented by the output signal the adder will add a predetermined number of bits to the address of the memory bus, then since the data are delivered to the memory bus after elapse of a time to read the predetermined number of bits, the time required to deliver the data can be adjusted by the added number of bits. The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
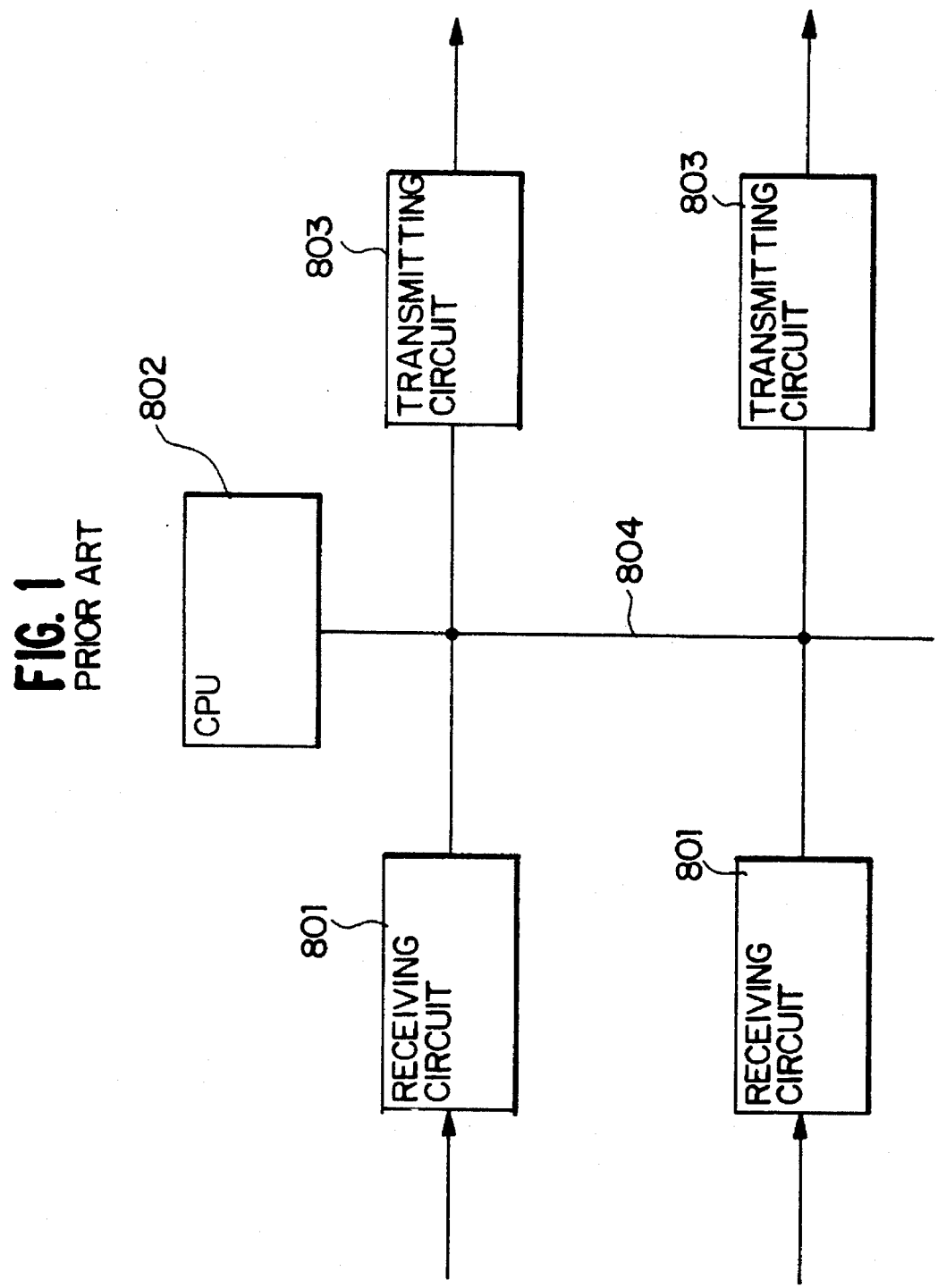
FIG. 1 is a block diagram of a conventional communication data switching apparatus.
Figure 2:
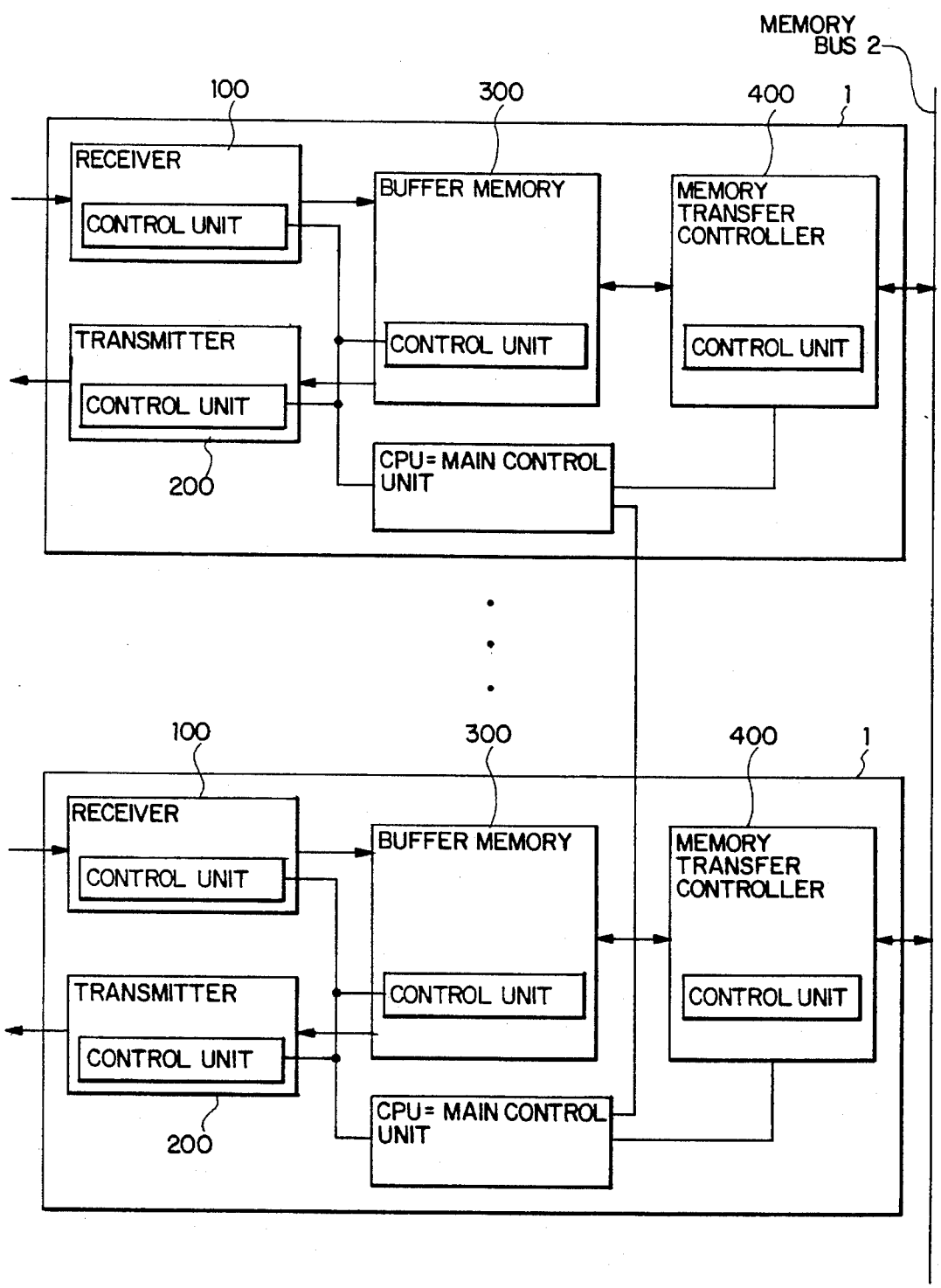
FIG. 2 is a block diagram of a communication data switching apparatus according to the present invention.

FIG. 2 shows in block form a communication data switching apparatus according to the present invention. The communication data switching apparatus is particularly useful for transmitting packets of audio data in a MCA system used in digital business radio services.

As shown in FIG. 2, the communication data switching apparatus includes a plurality of units 1 connected to a memory bus 2. Each of the units 1 comprises a receiver 100, a transmitter 200, a buffer memory 300, and a memory transfer controller 400. In each of the units 1, the receiver 100 is connected directly between an input line and the buffer memory 300, and the transmitter 200 is connected directly between an output line and the buffer memory 300. The memory transfer controller 400 is connected directly between the buffer memory 300 and the memory bus 2. The receiver 100, the transmitter 200, the buffer memory 300, and the memory transfer controller 400 are controlled by respective control units FIG. 2 disposed therein and a CPU (FIG. 2) which is a host device for the control units. The receiver 100, the transmitter 200, the buffer memory 300, and the memory transfer controller 400 are connected to each other through the CPU.

Serial data supplied from the input line to one of the units 1 are received by the receiver 100 and converted thereby into bytes of parallel data which are then successively written in the buffer memory 300.

Immediately after the parallel data have been written in the buffer memory 300, the written parallel data are converted by the memory transfer controller 400 into serial data which are then transferred through the memory bus 2 simultaneously to all other units 1. In each of the all other units 1, the transferred data are received by the memory transfer controller 400, converted thereby back to parallel data which are then written in the buffer memory 300. The transmitter 200 adds a new header to the data stored in the buffer memory 300, and converts the data from the buffer memory 300 into serial data which are then outputted from the output line.

Figure 3:
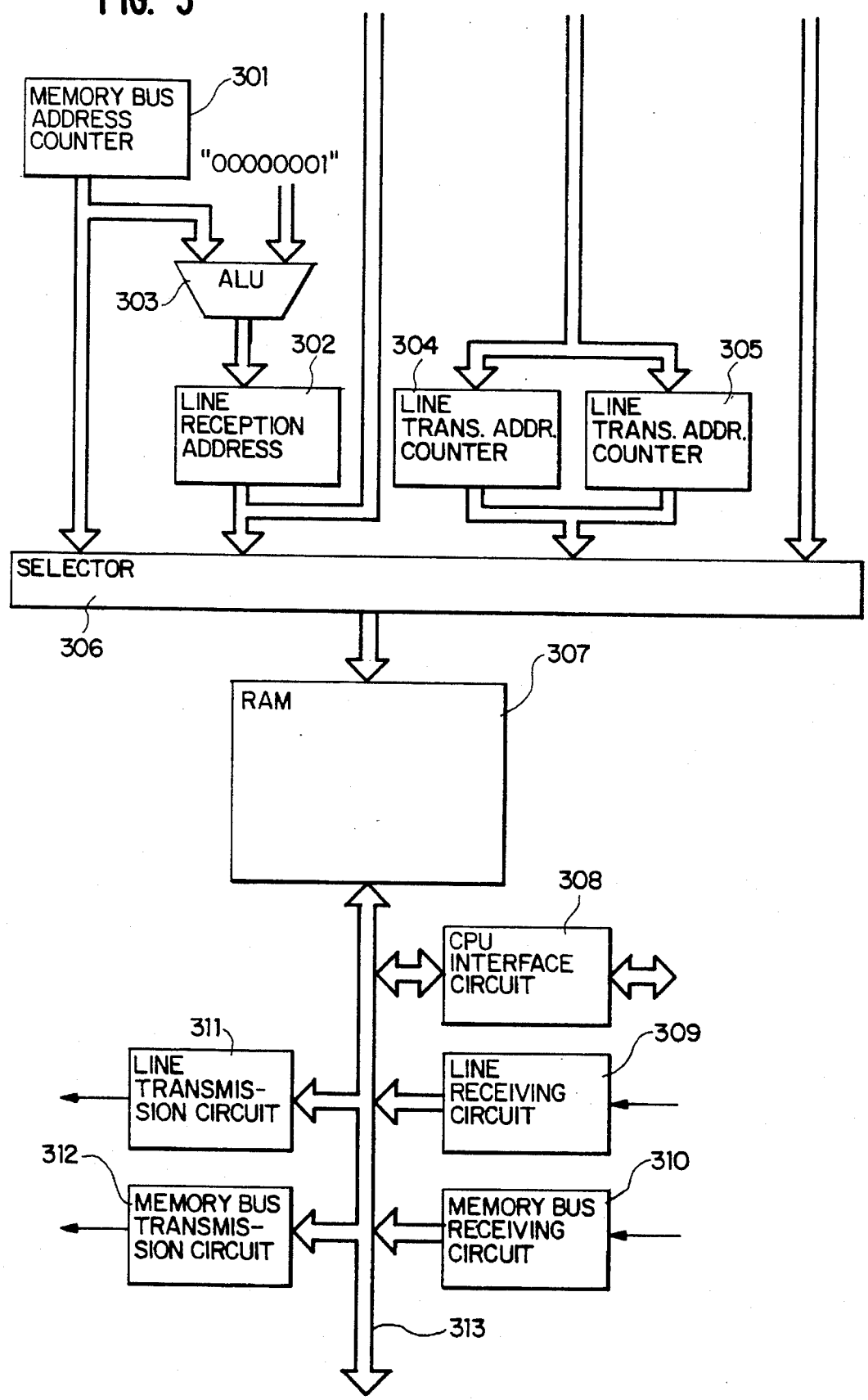
FIG. 3 is a block diagram of each of the buffer memories shown in FIG. 2.

FIG. 3 shows in block form a detailed structure of each of the buffer memories 300 shown in FIG. 2.

As shown in FIG. 3, the buffer memory 300 comprises a 5-port RAM which includes a selector 306, a memory data bus 313, and a RAM 307 which is supplied with an address through the selector 306 and data through the memory data bus 313.

The selector 306 is supplied with an output signal from a memory bus address counter 301, the sum of a predetermined unit number assigned to each of the units 1 and an output signal from a line reception address counter 302 which is supplied with an output signal from an arithmetic logic unit (ALU) 303 to which the output signal from the memory bus address counter 301 and a predetermined bit train "00000001" are supplied, an output signal from a line transmission address counter 304 which is supplied with control data from the CPU, an output signal from a line transmission address latch 305 which is also supplied with the control data from the CPU, and an address directly from the CPU. The selector 306 selects either one of the supplied signals, and outputs the selected signal to the RAM 307.

To the memory data bus 313, there are connected a memory bus receiving circuit 310 for receiving data from the memory bus 2, a memory bus transmitting circuit 312 for transmitting data to the memory bus 2, a line receiving circuit 309 for receiving data from the input line, a line transmitting circuit 311 for transmitting data to the output line, and a CPU interface circuit 308 connected to the CPU which controls the components in the unit 1. The RAM 307 is connected to these circuits through the memory data bus 313 for being accessed thereby. The RAM 307 is used as a 5-port RAM configuration in a time-division multiplex mode by these circuits. In this embodiment, the time-division multiplex mode has a basic clock frequency of 4.096 MHz.

Figure 4:
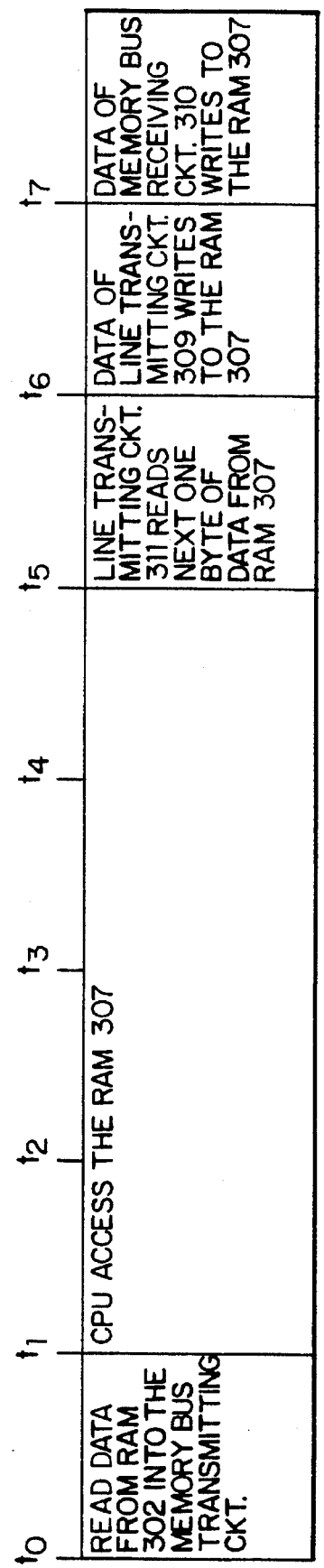
FIG. 4 is a timing chart of operation of the buffer memories shown in FIG. 2.

The time-division multiplex mode of each of the buffer memories 300 will be described below with reference to FIG. 4.

In the time-division multiplex mode, one period is composed of 8 clock pulses which start respectively at times $t_0$–$t_7$.

At the time $t_0$, one byte of data is read from the RAM 307 into the memory bus transmitting circuit 312 and converted into 8-bit serial data thereby. The 8-bit serial data will be transmitted to the memory bus 2 during a period from the time $t_0$ to the time $t_7$.

During a period from the time $t_1$ to the time $t_4$, the CPU can access the RAM 307. During this period, the selector 306 selects the CPU address, and the CPU interface circuit 308 connects the CPU and the memory data bus 313 to each other.

Since the CPU directly accesses the RAM 307, signal editing such as for the conversion of a header for packet transmission can be carried out in the buffer memory 300 during this period.

The CPU writes high-order 10 bits of addresses of the RAM 307 where the initial portion of edited transmission data is stored, into the line transmission address counter 304, and writes low-order 6 bits thereof into the line transmission address latch 305.

The line transmitting circuit 311 reads one byte of data from the RAM 307 with an address indicated by the line transmission address counter 304 and the line transmission address latch 305, converts the read byte of data into serial data, and transmits the serial data to the output line. After 8 bits corresponding to one byte of data have been transmitted, the CPU updates the line transmission address counter 304, accesses the RAM 307 at the time $t_5$, reads the next one byte of data from the RAM 307, and sets the read byte of data in the line transmitting circuit 311.

As described later, transmission data in the buffer memory are written at intervals of 64 bytes. Therefore, low-order 6 bits of addresses indicative of transmission data are fixed, and only high-order 10 bits thereof are updated.

The line receiving circuit 309 converts each byte of serial data received from the input line into parallel data, and writes the parallel data in the RAM 307 at the time $t_6$.

The memory bus receiving circuit 310 converts 8-bit serial data transmitted from the time $t_0$ to the time $t_7$ into parallel data, and writes the parallel data in the RAM 307 at the time $t_7$.

The data are put into and out of the memory bus 2 using addresses indicated by the memory bus address counter 301.

The memory bus address counter 301 is employed to establish synchronism between the units 1. The memory bus address counter 301 comprises a 16-bit counter which counts up every 8 bits at the basic clock frequency of 4.096 MHz, i.e., at a rate of 512 kHz.

Figure 5:
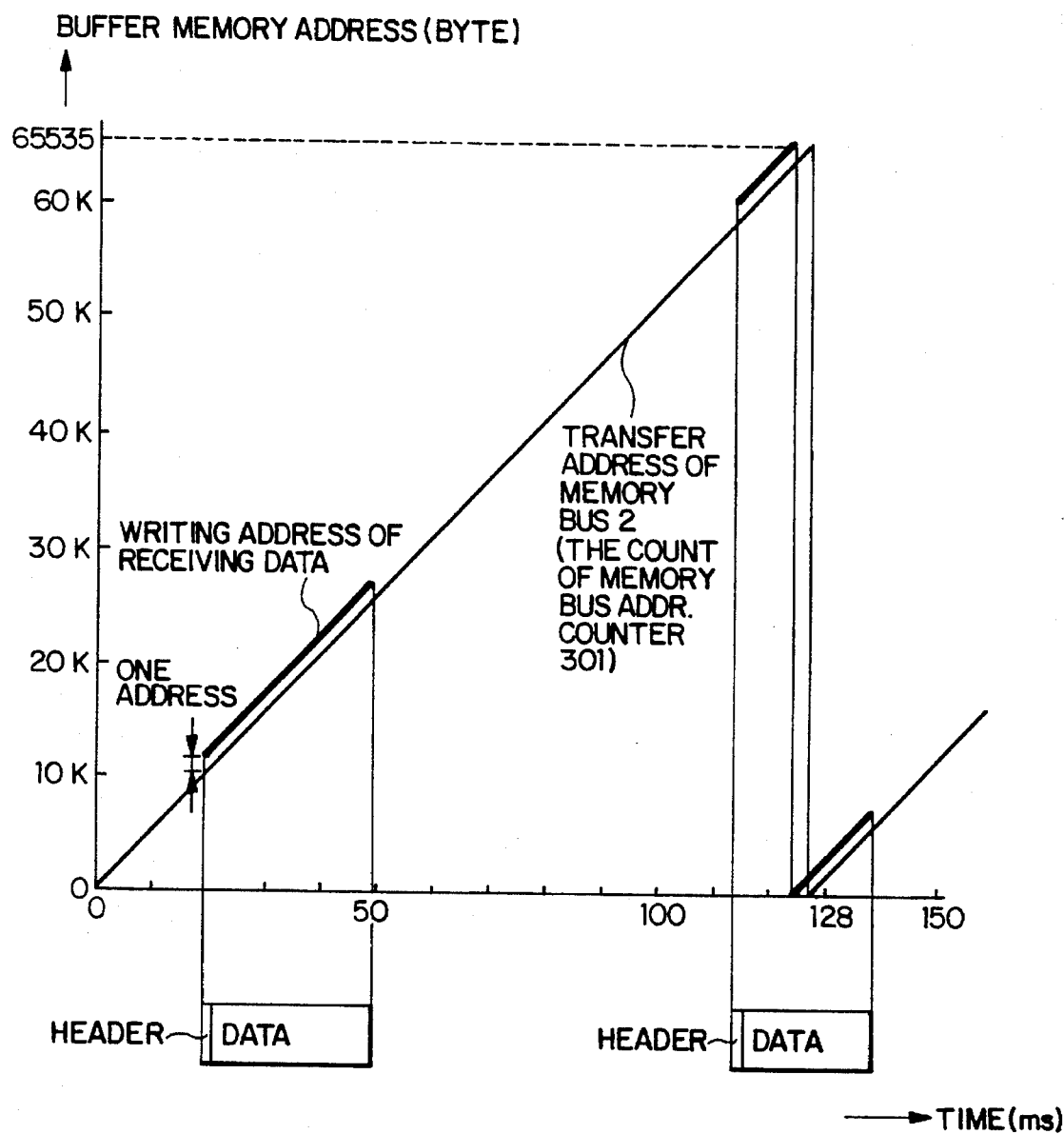
FIG. 5 is a diagram showing the timing of operation and addresses of the buffer memories shown in FIG. 2.

FIG. 5 shows the relationship between the count of the memory bus address counter 301 and time.

The count of the memory bus address counter 301 is 0 at a time 0. The count of the memory bus address counter 301 periodically varies such that it increases with time and returns to 0 upon elapse of 128 ms. The communication data switching apparatus in the illustrated embodiment has a basic clock delivery circuit (not shown). The memory bus address counters 301 in the respective units 1 are arranged to have their counts fully synchronized between the units 1 by a clock signal outputted from the basic clock delivery circuit.

When reception data start being received by the receiver 100, the line reception address counter 302 loads the output signal from the ALU 303 as an address in the timed relation to the start of reception of the data. The loaded address is the sum of the count of the memory bus address counter 301 and the bit train "00000001" which are added by the ALU 303.

In FIG. 5, the reception data start being received upon elapse of 20 ms, and their reception ends upon elapse of 50 ms. Since the address at which the reception data are written in the buffer memory 300 is the sum of the transfer address of the memory bus 2 and "1", the reception data are delivered to the memory data bus 313 without delay immediately after the reception data have been written in the RAM 307 in the buffer memory 300, transmitted through the memory bus transmitting circuit 312 to the memory bus 2, and transferred to all other units 1.

The time required until the reception data are delivered to the memory bus 2 is determined by adjusting the number of bits to be added by the ALU 303. Consequently, the time required until the reception data are delivered to the memory bus 2 can easily be adjusted depending on the operation of the communication data switching apparatus.

Figure 6:
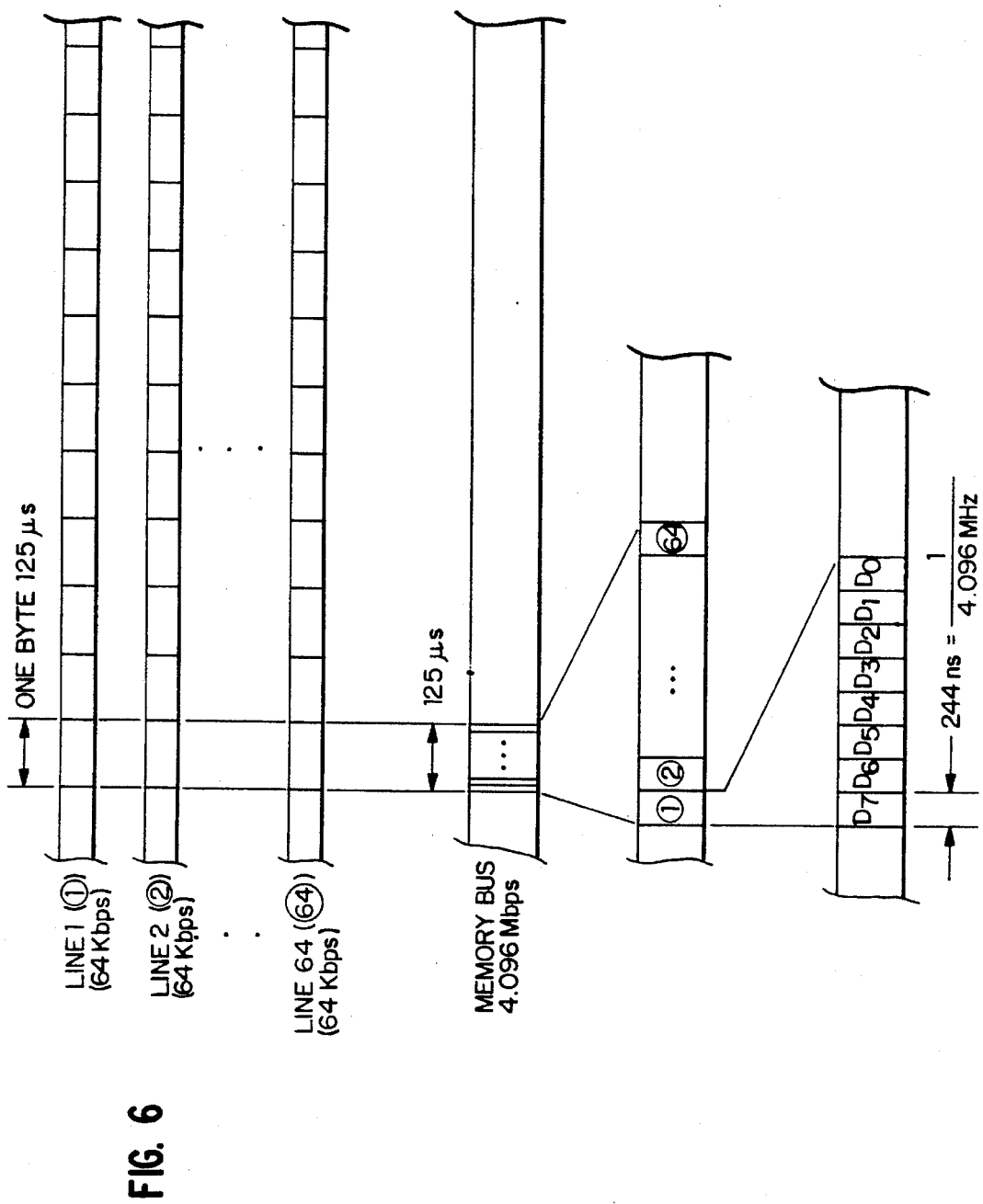
FIG. 6 is a timing chart of operation of a memory bus shown in FIG. 2.

FIG. 6 shows a timing sequence of data on the lines of each unit and a timing sequence of the memory bus 2.

Each of the units 1 is associated with 64 lines which transmit data at a rate of 64 Kbps. There are 64 units, and each unit is connected to each of the other units through one line.

All data from the units are multiplexed on the memory bus 2 and transferred at a rate of 4.096 Mbps.

Each byte of data on the lines is multiplexed on the memory bus 2, and 64 bytes of data of the lines 1 through 64 are multiplexed in a time-division multiplex mode during 125 µs.

Figure 7:
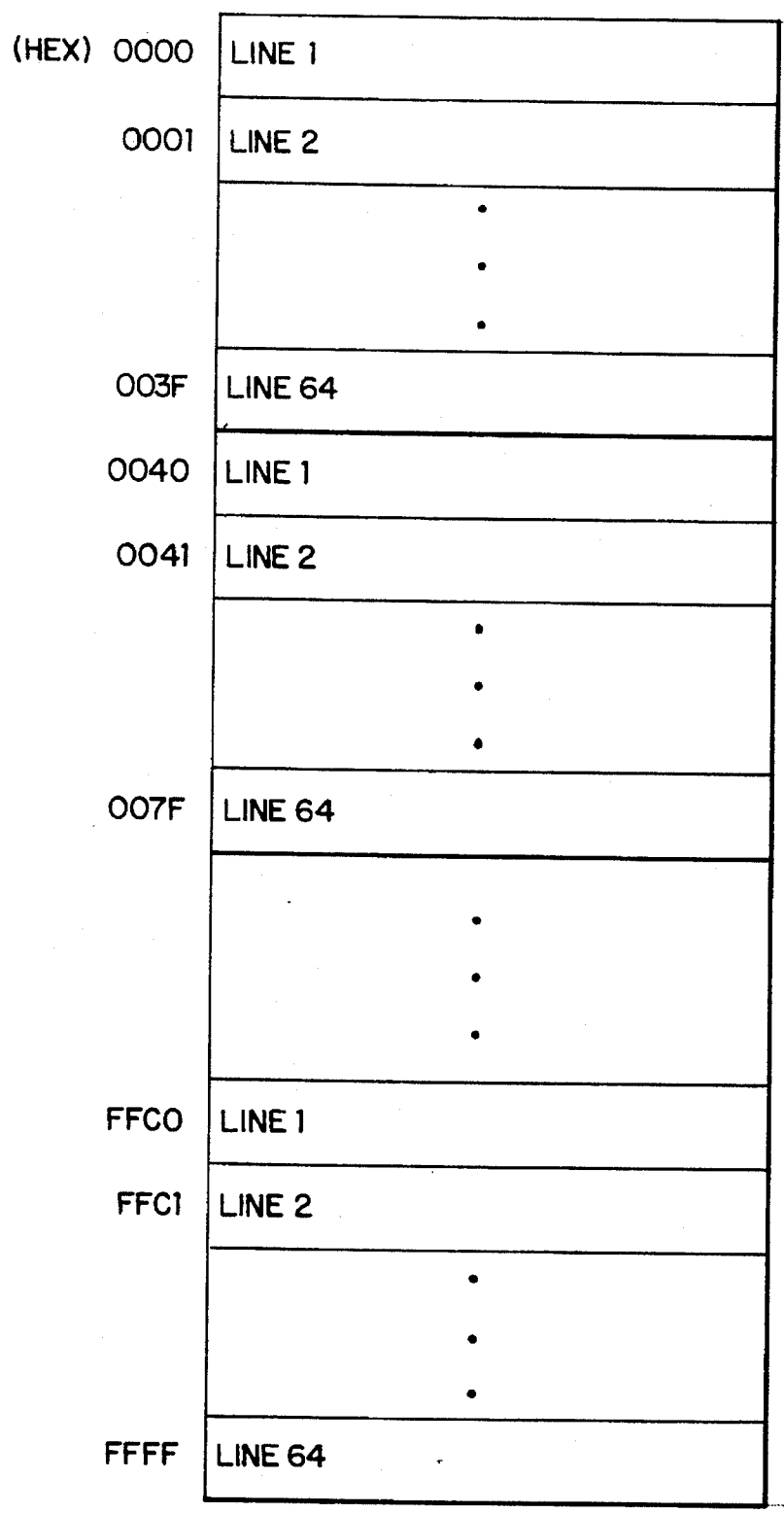
FIG. 7 is a diagram showing a memory map of the buffer memories shown in FIG. 2.

FIG. 7 shows the allocation of addresses in the buffer memory 300.

The addresses are divided every 64 bytes, and the data of the lines 1 through 64 are written in bytes. The buffer memory 300 has a storage capacity of 64 Kbytes. 64-byte data are written in the buffer memory 300 in 125 µs in synchronism with the transfer of data in the memory bus 2. After elapse of 125 µs, the address returns to the address 0, and the buffer memory 300 writes data over the existing data.

Because the buffer memory 300 of each unit stores the data received by all the units for the past 125 µs, the transmitter 200 can search the data stored in the buffer memory 300 for data to be relayed, rewrite the header code into a header code for transmission, and transmit the data.

Figure 8:
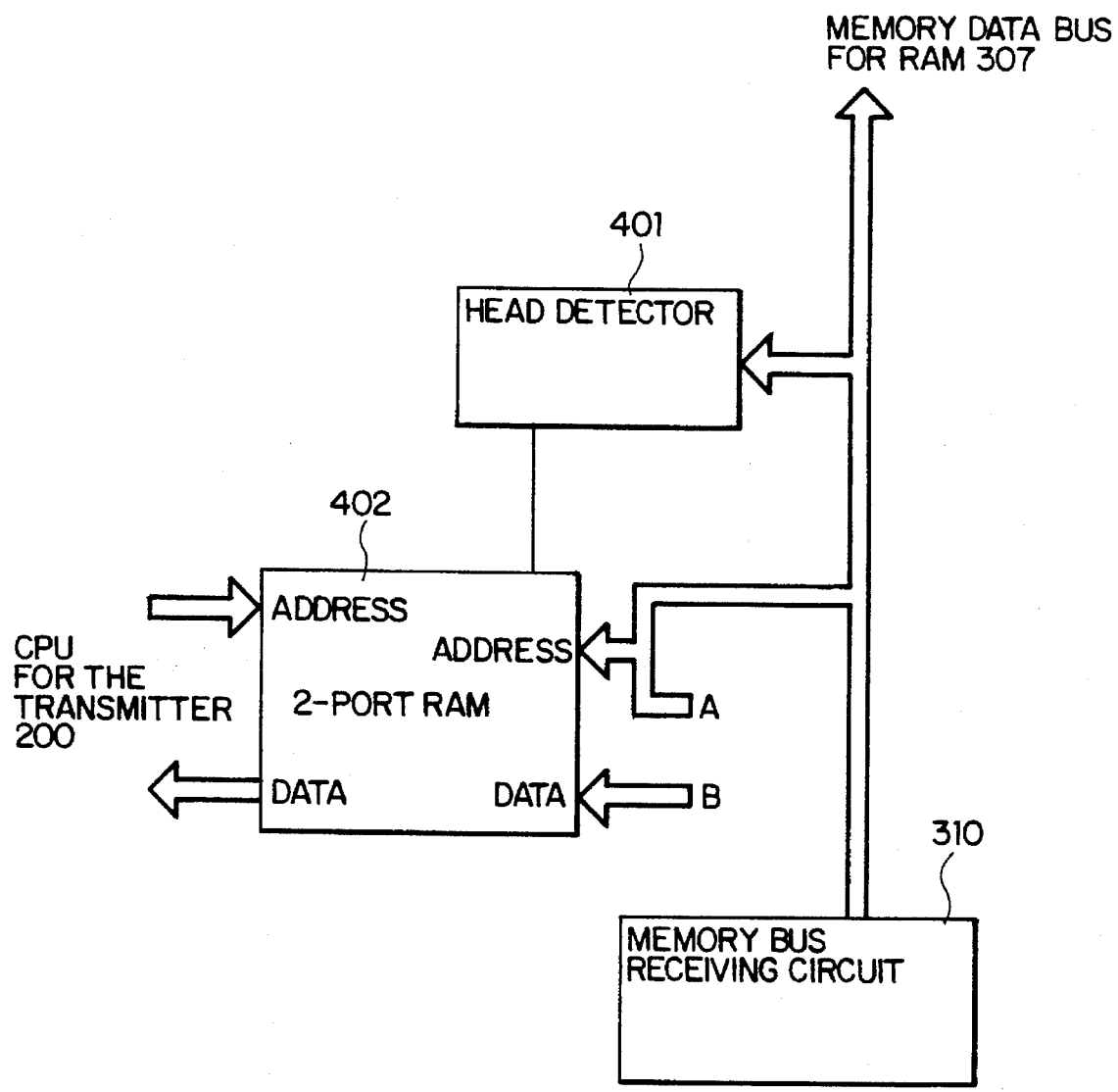
FIG. 8 is a block diagram of an arrangement for quickly searching for data to be relayed.

FIG. 8 shows in block form an arrangement of the memory transfer controller 400 for quickly searching for data to be relayed from the data stored in the buffer memory 300.

The memory transfer controller 400 comprises a header detector 401 and a 2-port RAM 402. Reception data sent from the memory bus 2 are converted by the memory bus receiving circuit 310 into parallel data, which are simultaneously written in the RAM 307 and checked by the head detector 401.

When the head detector 401 detects the header of data to be transmitted, the head detector 401 uses low-order 6 bits of 16-bit data of the memory bus address counter 301 as a portion "A" of an address of the 2-port RAM 402, and also uses a destination code contained in the header code as the remainder of the address of the 2-port RAM 402.

In the 2-port RAM 402, high-order 10 bits of the 16-bit data of the memory bus address counter 301 are written as data "B" at the address thus determined.

Therefore, the address at which the data are written in the 2-port RAM 402 includes low-order 6 bits of the 16-bit data of the memory bus address counter 301 at the time the header of the reception data is written in the RAM 307, the low-order 6 bits being indicative of the number of the line over which the data have been received.

The address of the 2-port RAM 402 also includes the destination code of the reception data. By accessing the 2-port RAM 402, the CPU for the transmitter 200 can read the data of the address from the RAM 307 where the header of the received signal is stored from the line number and the destination code. Reading data of this address allows a relaying process to be performed for quickly detecting and delivering data to be transmitted.

According to the present invention, inasmuch as data received by one unit are immediately transferred to all other units, i.e., the buffer memories associated with the transmitters connected to all the other lines, the received signal can be distributed without delay to a plurality of output lines and simultaneously transmitted.

Furthermore, the communication data switching apparatus can easily be designed because the time required after data have been received until the received data are delivered to the memory bus can be adjusted by the number of bits to be added.

The communication data switching apparatus can be used to establish a communication data switching system.

Although certain preferred embodiments of the present invention have been shown and described in detail, it should be understood that various changes and modifications may be made therein without departing from the scope of the appended claims.

What is claimed:

1. A communication data switching apparatus having a communication data switching unit for use between an input line, an output line, and a memory bus, said unit comprising:

an adapted receiver connected to the input line;

an adapted transmitter connected to the output line;

a buffer memory for storing data received by said receiver and data to be transmitted by said transmitter;

a memory transfer controller for controlling transfer of data between said buffer memory and the memory bus; and main control means for controlling said receiver, said transmitter, said buffer memory, and said memory transfer controller to enable storing of data which has been received from the input line by said receiver, in said buffer memory, transferring of the data to the memory bus, confirming whether the data on the memory bus are addressed to a station to which the main control means belongs, based on the content of the data, and delivering the data through said transmitter to the output line if the data are addressed to the station.

2. A communication data switching apparatus of claim 1, wherein said buffer memory comprises:

a memory bus address counter for establishing synchronism between said communication data switching units, a memory data bus, a line receiving circuit for outputting received data from said receiver to said memory data bus, a memory bus receiving circuit for outputting data from the memory bus to said memory data bus, a memory bus transmitting circuit for delivering data from said memory data bus to the memory bus, an interface circuit for exchanging data between said memory data bus and said main control means, a RAM having a data terminal connected to said memory data bus, and an adder for adding a predetermined number of bits to an output signal from said memory bus address counter, and wherein said main control means comprises means for writing the signal received by said receiver in said RAM at an address represented by an output signal from said adder.

3. A communication data switching apparatus of claim 1, further comprising another communication data switching unit which corresponds to said communication data switching unit, each of said communication data switching units being interconnected by said memory bus.

4. A communication data switching apparatus of claim 2, further comprising another communication data switching unit which corresponds to said communication data switching unit, each of said communication data switching units being interconnected by said memory bus.

* * * * *